United States Patent
Avagliano et al.

(10) Patent No.: US 8,649,911 B2
(45) Date of Patent: Feb. 11, 2014

(54) SYSTEM AND METHOD FOR OPERATING A WIND FARM UNDER HIGH WIND SPEED CONDITIONS

(75) Inventors: Aaron John Avagliano, Niskayuna, NY (US); Ralph Teichmann, Cohoes, NY (US); Kirk Gee Pierce, Simpsonville, SC (US); Paul David Hopewell, Staffordshire (GB); Ameet Shridhar Deshpande, Pune (IN); Sukru Alper Eker, Guilderland, NY (US)

(73) Assignee: General Electric Company, Niskayuna, NY (US)

( * ) Notice: Subject to any disclaimer, the term of this patent is extended or adjusted under 35 U.S.C. 154(b) by 1708 days.

(21) Appl. No.: 11/144,931

(22) Filed: Jun. 3, 2005

(65) Prior Publication Data

US 2006/0273595 A1    Dec. 7, 2006

(51) Int. Cl.
| | |
|---|---|
| B63H 3/00 | (2006.01) |
| B64C 11/30 | (2006.01) |
| F01D 7/00 | (2006.01) |
| F03B 3/12 | (2006.01) |
| F03D 7/02 | (2006.01) |
| F03D 9/00 | (2006.01) |
| G05D 17/00 | (2006.01) |
| H02H 7/06 | (2006.01) |

(52) U.S. Cl.
USPC ............... 700/291; 700/286; 290/44; 290/55; 322/35; 416/41; 416/43; 416/44; 416/61; 416/63

(58) Field of Classification Search
USPC ......... 290/44, 55, 45; 322/35; 416/41, 63, 43, 416/44, 61; 700/286, 291
See application file for complete search history.

(56) References Cited

U.S. PATENT DOCUMENTS

| | | | | | |
|---|---|---|---|---|---|
| 4,160,170 | A | * | 7/1979 | Harner et al. | 290/44 |
| 4,193,005 | A | * | 3/1980 | Kos et al. | 290/44 |
| 4,339,666 | A | * | 7/1982 | Patrick et al. | 290/44 |
| 4,421,967 | A | * | 12/1983 | Birgel et al. | 219/631 |
| 4,426,192 | A | * | 1/1984 | Chertok et al. | 416/1 |
| 4,435,647 | A | * | 3/1984 | Harner et al. | 290/44 |
| 4,584,486 | A | * | 4/1986 | Quynn | 290/44 |
| 4,700,081 | A | * | 10/1987 | Kos et al. | 290/44 |
| 5,019,760 | A | | 5/1991 | Chu et al. | |
| 5,083,039 | A | * | 1/1992 | Richardson et al. | 290/44 |

(Continued)

FOREIGN PATENT DOCUMENTS

| | | |
|---|---|---|
| DE | 3150824 A1 | 12/1981 |
| DE | 3342583 A1 | 6/1985 |

(Continued)

OTHER PUBLICATIONS http://www.aha.net.au/Downloads/journals/journal0205.PDF (Feb. 2005).*

(Continued)

*Primary Examiner* — Mohammad Ali
*Assistant Examiner* — Jennifer L Norton
(74) *Attorney, Agent, or Firm* — Ann M. Agosti

(57) ABSTRACT

A technique is provided for operating a wind farm at increased rated power output. The technique includes sensing a plurality of operating parameters of the wind turbine generator, assessing the plurality of operating parameters with respect to respective design ratings for the operating parameters, and intermittently increasing a rated power output of the wind turbine generator based upon the assessment.

36 Claims, 5 Drawing Sheets

(56) References Cited

U.S. PATENT DOCUMENTS

| | | | |
|---|---|---|---|
| 5,155,375 A * | 10/1992 | Holley | 290/44 |
| 5,289,041 A * | 2/1994 | Holley | 290/44 |
| 5,639,964 A * | 6/1997 | Djorup | 73/170.12 |
| 6,137,187 A * | 10/2000 | Mikhail et al. | 290/44 |
| 6,320,272 B1 * | 11/2001 | Lading et al. | 290/44 |
| 6,420,795 B1 * | 7/2002 | Mikhail et al. | 290/44 |
| 6,619,918 B1 | 9/2003 | Rebsdorf | |
| 6,840,734 B2 | 1/2005 | Hansen | |
| 6,850,821 B2 * | 2/2005 | Weitkamp | 700/286 |
| 6,882,904 B1 * | 4/2005 | Petrie et al. | 700/295 |
| 7,013,203 B2 * | 3/2006 | Moore et al. | 700/286 |
| 7,042,110 B2 * | 5/2006 | Mikhail et al. | 290/44 |
| 7,071,579 B2 * | 7/2006 | Erdman et al. | 290/55 |
| 7,095,128 B2 * | 8/2006 | Canini et al. | 290/44 |
| 7,246,991 B2 * | 7/2007 | Bosche | 415/14 |
| 7,318,154 B2 * | 1/2008 | Tehee, Jr. | 713/155 |
| 7,322,794 B2 * | 1/2008 | LeMieux et al. | 416/40 |
| 2002/0000723 A1 | 1/2002 | Weitkamp | 290/44 |
| 2003/0160457 A1 * | 8/2003 | Ragwitz et al. | 290/44 |
| 2003/0185665 A1 * | 10/2003 | Hansen | 415/1 |
| 2005/0033557 A1 * | 2/2005 | House et al. | 702/184 |
| 2009/0180875 A1 * | 7/2009 | Egedal et al. | 416/43 |

FOREIGN PATENT DOCUMENTS

| | | |
|---|---|---|
| GB | 2089901 A | 6/1982 |
| GB | 2174259 A | 10/1986 |
| GB | 2338848 A | 12/1999 |
| WO | 0166940 A1 | 9/2001 |

OTHER PUBLICATIONS http://www.risoe.dk/rispubl/VEA/veapdf/ris-r-1063.pdf (Sep. 1998).* http://www.kidwind.org/Presentations/Energy%20In%20the%20Wind%20-%20Walt%20Musial.ppt.* http://www.kidwind.org/Presentations/Energy%20In%20the%20Wind%20-%20Walt%20Musial.ppt (2005).*

Search Report from corresponding ES Application No. 200600828 dated Jul. 21, 2008.

P. M. Brown et al., "Determination of the maximum cyclic rating of high-voltage power transformers", Power Engineering Journal, vol. 12, pp. 17-20, Feb. 1998.

R. Busch, "About the concept of consumed life of electrical machine windings and its application", European transactions on electrical power, vol. 8, No. 2, pp. 105-110, 1998.

S. Tenbohlen et al., "Assessment of overload capacity of power transformers by on-line monitoring systems", IEEE Power Engineering Society Winter Meeting, pp. 1-6, 2001.

* cited by examiner

SYSTEM AND METHOD FOR OPERATING A WIND FARM UNDER HIGH WIND SPEED CONDITIONS

STATEMENT REGARDING FEDERALLY SPONSORED RESEARCH & DEVELOPMENT

This invention was made with Government support under Contract ZAM-7-13320-26 under Prime Contract DE-AC36-83CH10093.

BACKGROUND

The invention relates generally to the field of wind power generation, and more particularly to techniques for regulating power rating of wind turbine generators.

Wind turbine generators are regarded as environmentally friendly and relatively inexpensive alternative sources of energy that utilize wind energy to produce electrical power. A wind turbine generator generally includes a wind rotor having a plurality of blades that transform wind energy into rotational motion of a drive shaft, which in turn is utilized to drive a rotor of an electrical generator to produce electrical power. Modern wind power generation systems typically take the form of a wind farm having multiple such wind turbine generators that are operable to supply power to a transmission system providing power to a utility grid.

Wind is an intermittent resource and collective power output of the wind farm is significantly influenced by changes in wind conditions. Wind conditions may change drastically in a relatively shorter time span. Generally, power output of a wind turbine generator increases with wind speed, until the wind speed reaches the rated wind speed for the turbine. With further increases in wind speed, the turbine operates at rated power up to a cut off value or a trip level. This is generally the wind speed at which dynamic loads on the wind turbine cause the mechanical components of the turbine to reach a fatigue limit that tend to shorten the lifespan of the turbine. As a protective function, at wind speeds higher than a certain speed, wind turbines are often required to shut down, or reduce loads by regulating the pitch of the blades or braking the rotor, thereby leading to a reduced power output of the wind turbine generator, and consequently of the wind farm. However, this limits the maximum power capture to the rated power set point, and increases the effective cost of energy of the wind farm. Thus, for a wind turbine generator, there exists an inherent trade off between the power at which it operates and its life, as protected by reference to the fatigue limit and other factors, that is, the maximum output rating.

Additionally, mechanical and thermal loads are the major factors that determine the rating of a wind turbine generator. The maximum power output of a wind turbine generator is decided at the design stage and is used to select appropriate ratings for other key components such as electrical generators, transformers, power conversion equipments, bearings, shafts, gearboxes, and so forth, with certain conservative assumptions. Conservative design practices and flat ratings of these components do not allow the operator to harness the excess energy in the wind once the full rated output has been achieved even if there may be additional energy in the wind. Hence, current techniques have limitations for achieving high power output during high wind speed conditions.

It is therefore desirable to provide a technique to efficiently and cost effectively harness higher wind energy during high wind speed conditions while ensuring baseline life of the wind turbine generators. It is also desirable to improve the design of the wind turbine generators so as to harness higher wind energy than that possible by the current designs.

BRIEF DESCRIPTION

Briefly, in accordance with one aspect of the technique, a method is provided for regulating power rating of a wind turbine generator. The method includes sensing a plurality of operating parameters of the wind turbine generator, assessing the plurality of operating parameters with respect to respective design ratings for the operating parameters, and intermittently increasing a rated power output of the wind turbine generator based upon the assessment. Systems and computer programs that afford such functionality may be provided by the present technique.

In accordance with another aspect of the technique, a control system is provided for regulating power rating of a wind turbine generator. The control system includes a plurality of sensors for sensing a plurality of operating parameters of the wind turbine generator and a processor for assessing the plurality of operating parameters with respect to respective design ratings for the operating parameters. The control system also includes a controller for intermittently increasing a rated power output of the wind turbine generator based upon the assessment.

In accordance with a further aspect of the present technique, a wind turbine generator is provided. The wind turbine generator includes a control system configured to intermittently increase the rated power output of the wind turbine generator based upon assessment of operating conditions of the wind turbine generator.

In accordance with an additional aspect of the present technique, a wind farm is provided. The wind farm includes a plurality of wind turbine generators and a wind farm control system. The plurality of wind turbine generators is operable to collectively supply electrical power to a utility system. The wind farm control system is configured to intermittently increase the rated power output of one or more of the plurality of wind turbine generators based upon assessment of operating conditions of the respective wind turbine generators.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The present technique provides a system and method for regulating power rating of a wind turbine generator. In the present technique, power is defined as apparent power, thus comprising real and reactive power components. The technique may be extended to similar rating of a wind farm having a plurality of wind turbine generators at high wind speeds via a central or supervisory wind farm control system. In certain embodiments, the wind farm control system is operable to regulate power rating of the wind farm by intermittently increasing the rated power output of the wind turbine generators such that the baseline life of the wind turbine generators are not compromised. Embodiments of the present technique are described in detail below referring generally to FIGS. 1-5.

Figure 1:
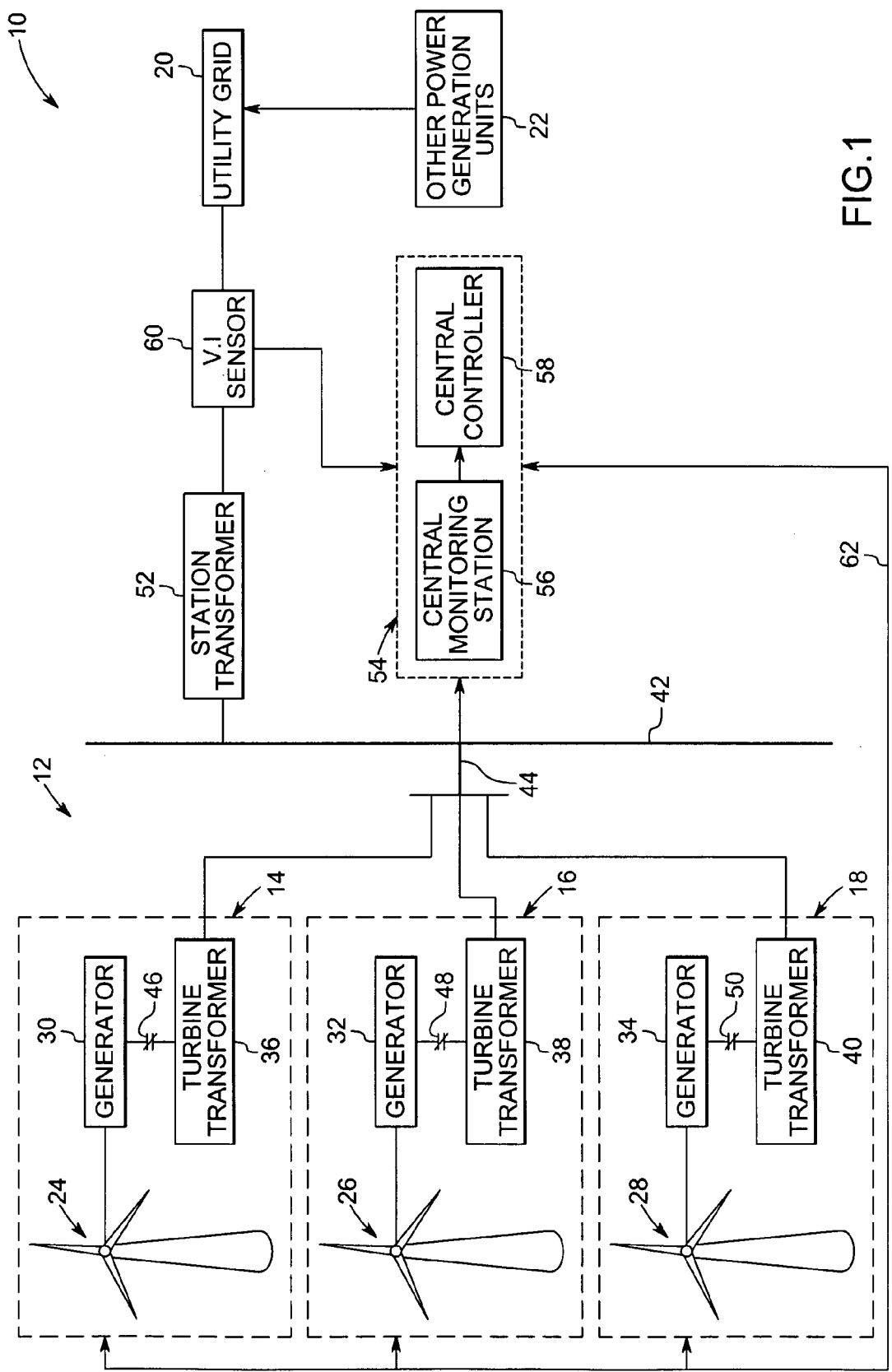
FIG. 1 is a schematic illustration of a wind power generation system according to aspects of the present technique.

FIG. 1 illustrates an exemplary wind power generation system 10 in accordance with aspects of the present technique. The wind power generation system 10 includes a wind farm 12 having a plurality of wind turbine generators 14, 16, 18 operable to supply electrical power to a utility 20. Additionally, the utility 20 may receive power from other power generation units 22 to accommodate variability in power output of the wind farm 12 due to changing wind conditions. Other power generation units 22 may include, for example, thermal, hydroelectric or nuclear power stations, among others.

Wind turbine generators 14, 16, 18 include turbine rotors 24, 26, 28 having plurality of blades which drive rotors of electrical generators 30, 32, 34 to produce electrical power. Power produced by generators 30, 32, 34 may be stepped up in voltage by turbine transformers 36, 38, 40 before being coupled to a medium voltage distribution network 42. In the illustrated embodiment, a feeder 44 is used to couple power outputs of wind turbine generators 14, 16, 18 for supply to the medium voltage distribution network 42. In a typical application, the medium voltage distribution network 42 couples power from multiple feeders (not shown), each feeder coupling power outputs of a plurality of wind turbine generators. In certain embodiments, power is coupled from the wind turbine generators 14, 16, 18 to the feeder 44 via switching devices 46, 48, 50, which may include, for example an electrical circuit breaker. Such switching devices are generally used in wind power generation systems to shut down power generation by one or more of the wind turbine generators during high wind conditions with high turbulence intensity. A station transformer 52 is generally used to step-up or step-down voltage of the power from the medium voltage distribution network 42 to a transmission voltage required by the utility 20.

In accordance with the present technique, the wind farm 12 includes a wind farm control system 54 comprising a central monitoring station 56 and a central controller 58. In the illustrated embodiment, the wind farm control system 54 is operable to monitor and control the collective power output of the wind farm 12. The wind farm control system 50 further comprises power sensors, such as voltage and current sensors 60, which are configured to sense collective power output of the wind farm 12 and may either be coupled to an output of the station transformer 52 (as illustrated in FIG. 1) or to a point in the medium voltage distribution network 42.

The wind farm control system 54 is configured to communicate with individual wind turbine generators via communication links 62, which may be implemented in hardware and software. In certain embodiments, the communication links 62 may be configured to remotely communicate data signals to and from the wind farm control system 54 in accordance with any wired or wireless communication protocol known to one skilled in the art. As discussed later, such data signals may comprise signals indicative of operating conditions of individual wind turbine generators transmitted to the wind farm control system 54 and various command signals communicated by the wind farm control system 54 to individual wind turbine generators. The wind farm control system 54 may further be in communication with the medium voltage distribution network 42, and may be operable to control various switching devices in the network 42, such as capacitors and reactors (not shown) so as to control the power output of the wind farm 12 within specifications prescribed by transmission system operators.

As discussed earlier, wind turbine generators 14, 16, 18 are generally designed to generate power at wind speeds lower than a predetermined threshold, also referred to as protective wind speed limit, also referred to as cutout wind speed. However, in the illustrated embodiment, the rated power output of the wind turbine generator may be intermittently increased based on the assessments of the operating conditions such that the baseline life of the wind turbine generators is not compromised. For example, due to variations and periods when turbine is run lower than maximum power rating, turbine can be run above rated set point for short periods while still maintaining expected equipment life expectancies. This decision can be easily made by looking at the duty cycle of machine.

Additionally, each of the wind turbine generators has an autonomous controller protection function that requires the wind turbine generator to trip or shut down power generation when wind speeds at the wind turbine generator exceed this protective wind speed limit and the baseline life of the wind turbine generators would be affected such as during high wind conditions with high turbulence intensity. In one embodiment, such as in case of a wind turbine generator having variable-pitch blades, a shutdown operation may include pitching the blades toward stall (i.e. at 90 degrees to the wind direction) or feather (i.e. at 0 degrees to wind direction), resulting in minimal capture of wind energy by the blades. In a further embodiment, a shutdown operation may include mechanical braking of the turbine rotor. In a still further embodiment, shutdown may be accomplished via switching devices as illustrated in FIG. 1.

The present technique provides a control mechanism whereby the rated power output of the wind turbine generators may be intermittently increased so as to increase the collective power output of the wind farm 12. In accordance with aspects of the present technique, individual wind turbine generators are configured to anticipate their increased rated power output and communicate a signal to the wind farm control system 54. The signal typically comprises a request by the wind turbine generator to operate the wind turbine generator at an increased power output than its rated power output so as to harness higher wind energy. The wind farm control system 54 is configured to monitor the operating conditions of the individual wind turbine generators, assess the request automatically or through operator interface and authorize or decline the request based on a farm level assessment of the operating conditions carried out by the wind farm control system 54 automatically or by the operators. The selection of individual wind power generators that are allowed to operate at higher power rating may be based on farm level assessment of the operating conditions of the wind turbine generators with respect to other conditions such as the power output of the other power generation units 22, life of the individual wind power generators, the number of times the wind power generators have already been allowed to operate above the rated power set point in the past and so forth.

Figure 2:
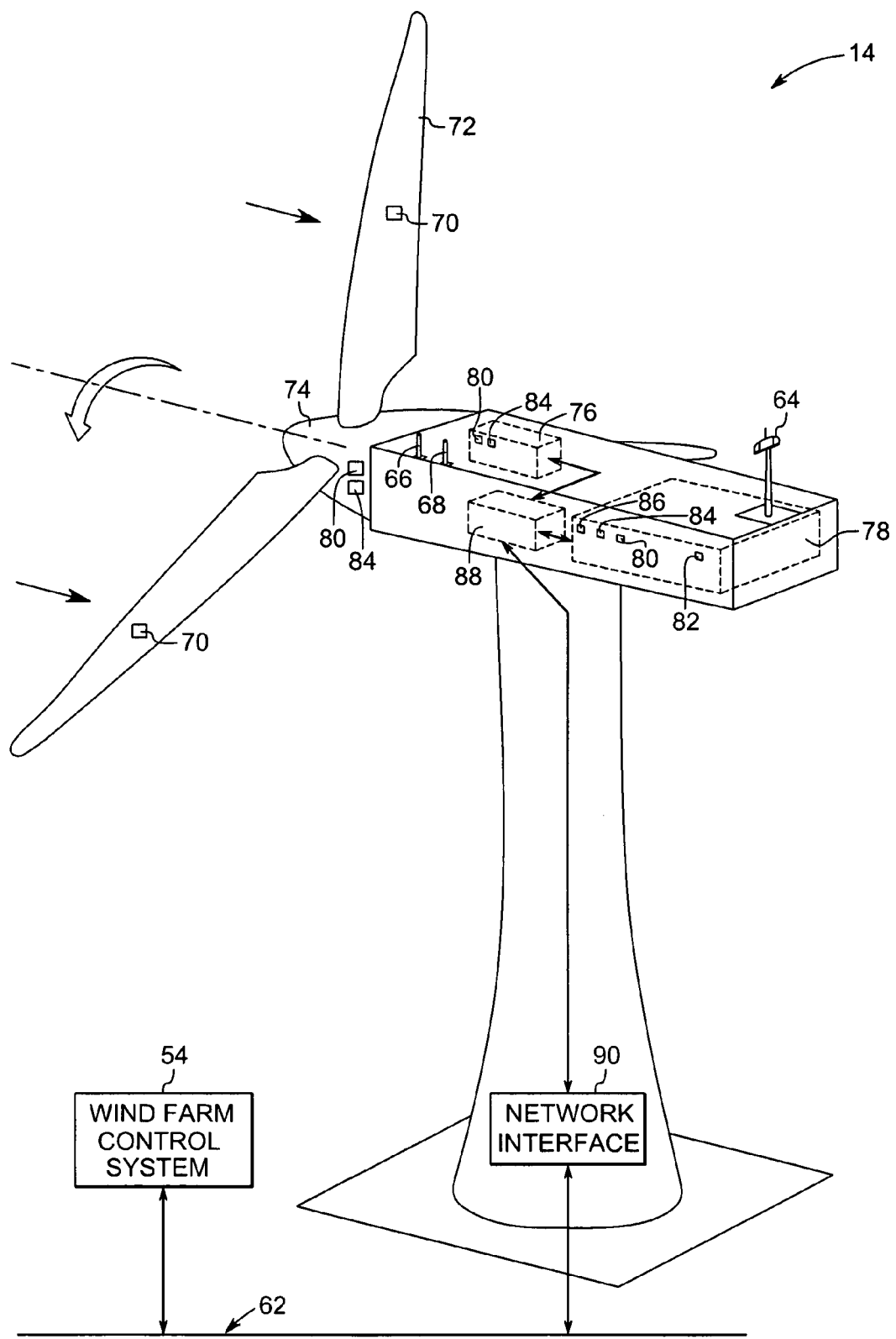
FIG. 2 is a schematic illustration of functional components of a wind turbine generator according to aspects of the present technique.

As illustrated in FIG. 2, a wide variety of sensors may be installed on the individual wind turbine generators to acquire and continuously monitor the operating parameters such as electrical, mechanical, thermal or meteorological operating parameters that reflect the operating conditions of the respective wind turbine generators. For example, one or more sensors may be used to acquire wind speed, mean wind speed, wind speed variance, and/or wind turbulence intensity. Alternatively, a sensor such as an anemometer 64 may be installed to acquire the data on wind speed. The wind speed variance and hence the wind turbulence intensity, which is a ratio between mean wind speed and wind speed variance, may then be derived indirectly from mean wind speed and rotor speed.

Similarly, a temperature sensor 66 and/or a pressure sensor 68 may be installed on the wind turbine generator 14 to acquire the ambient temperature and/or atmospheric pressure. As will be appreciated by one skilled in the art, a projected wind speed may also be derived from the above acquired parameters. Further, one or more sensors 70 may be installed on the turbine blades 72 to acquire the blade pitch angle and the mechanical stress on the turbine blades 72. The mechanical stresses to which the turbine shaft 74, the gearbox 76 or mechanical components of the generator 78 are subjected may be further acquired via sensors 80 installed on the turbine shaft 74, gearbox 76 and/or the generator 78.

Additionally sensors 82 may be installed to sense torque or speed of generator 78 or rotor. Further, thermal sensors 84 may be installed on the turbine shaft 74, the gearbox 76 and/or the generator 78 to monitor the thermal stress to which wind turbine generator 14 is subjected. The monitoring of thermal stress may include continuously monitoring the operating temperatures of the key power limiting components within the wind turbine generator such as electrical generator, power converter, and transformer. In certain embodiments, the monitoring may be extended to include mechanical aspects such as the gearbox oil temperature that may also give additional idea about the mechanical stress of the gearbox 76. Further, one or more electrical sensors 86 may be installed in the generator 78 to sense the current, voltage and/or output power of the wind turbine generator 14 to compute the electrical stress.

The acquired operating parameters may then be communicated to a controller 88 where an assessment of the operating condition of the wind turbine generator 14 is made based on the operating parameters. The controller 88 may then decide whether or not to intermittently increase the rated power output of the wind turbine generator 14 based on the assessment as described in greater detail below. The request for increasing the rated power output may then be communicated to the wind farm control system 54 via a network interface 90 over the communication link 62 such as an optical fiber or Ethernet link. Alternatively, the acquired operating parameters and/or the assessment of the operating conditions of the wind turbine generator 14 based on the operating parameters may be communicated directly to the wind farm control system 54 over the communication link 62. The wind farm control system 54 may then decide whether or not to intermittently increase the rated power output of the wind turbine generator 14 based on the operating conditions of the wind turbine generator. As described earlier, the wind farm control system 54 may make this decision based on various other factors either automatically or through operators and communicate the same back to the controller 88. Based on the confirmation the controller 88 may then up rate the rated power output of the wind turbine generator 14 for harnessing the excess wind energy for a transient period of time such that the baseline life of the wind turbine generator 14 is not compromised. It should be noted that, in certain embodiments, the transient period of time may be predetermined based upon the assessment of operating conditions.

Figure 3:
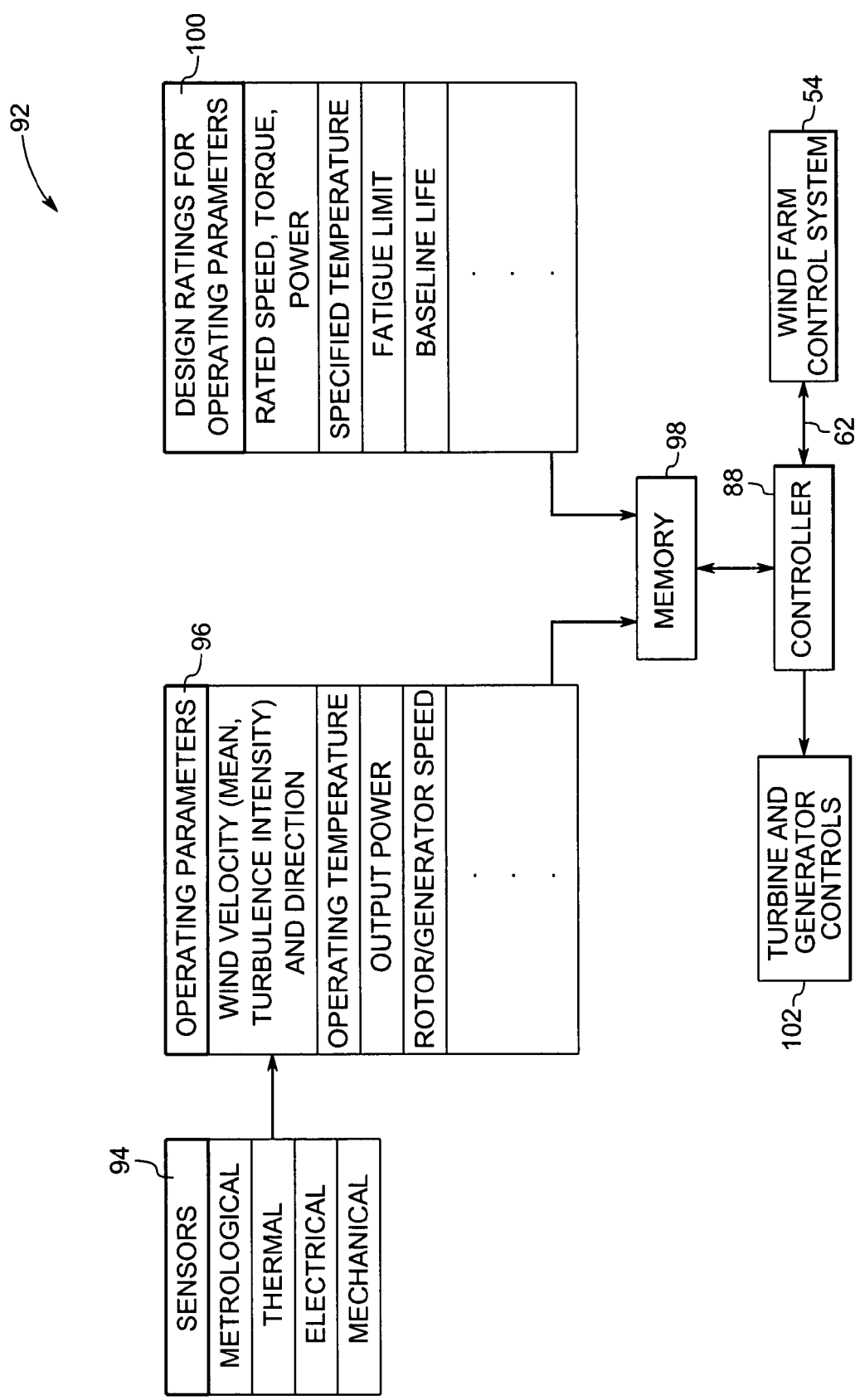
FIG. 3 is a schematic illustration of control mechanism of a wind turbine generator according to aspects of the present technique.

The assessment of the operating conditions of the wind turbine generator for intermittently increasing the rated power output of the wind turbine generator is described via a schematic control mechanism 92 as illustrated in FIG. 3. The electrical, mechanical, thermal and/or meteorological sensors 94 installed on the wind turbine generators as described above measure various operating parameters 96 representing the operating conditions of the wind turbine generator. These parameters 96 may include for example mechanical loads, wind speed, mean wind speed, wind speed variance, wind turbulence intensity, projected wind speed, temperature loads, atmospheric temperature, atmospheric pressure, air density, output power of wind turbine generator, torque or speed of generator or rotor, and/or blade pitch angle. The operating parameters 96 may then be stored in a memory 98. It should be understood that any type of memory 98 may be utilized by the control system. The memory 98 may further store the design ratings 100 for the acquired operating parameters. The operating parameters 96 are then compared to their respective design ratings via the controller 88 to assess the operating conditions of the wind turbine generator. The controller 88 may then decide whether or not to up rate the rated power output of the wind turbine generator for the real time operating conditions. In other words, the rating of the wind turbine generator is determined on a real time basis. As will be appreciated by those skilled in the art, while single parameters may be compared against their design limits or ranges, in many systems, a collection of such parameters will be employed in the comparison. The technique may also call for generation of a composite parameter based upon the sensed and design values such that several factors are taken into account simultaneously. The particular composite and its computation will typically depend upon the design of the generator and the preferences of the operator in respecting the design constraints.

For example, flat rating of wind turbines does not account for the excess capacity that may be present in the electrical components of the wind turbine generator. Such capacity may arise due to the uncertainties associated with ambient cooling and recent operating history. For example, cold weather will result in lower equipment temperatures for a given power throughput than would a hot weather, due to the improved cooling available. Furthermore, a system that has been unloaded for a considerable time, and thus cooled down, has a much higher short-duration capability than a machine that is already close to its maximum temperature. The controller 88 may determine a real time available power rating based upon thermal information available from continuous temperature monitoring and may intermittently increase the rated power output based upon the real time available power rating. The controller 88 may then authorize or seek authorization from wind farm control system 54 to allow the up rate of wind turbine generator until the level of available real capacity subject to the prevailing wind strength. The rated power output of the wind turbine generator is dynamically changed via turbine and generator control 102. As will be appreciated by those skilled in the art, the rated power output of the wind turbine generator may be increased by operating the wind turbine generator at a higher torque or speed than the design rated torque or speed. Alternatively, in certain embodiments, the rated power output of the wind turbine generator may be increased by operating the wind turbine generator at higher output currents than the design rated current at any torque and speed of the wind turbine generator. It should be noted that this enables increase in the output power capabilities even at low or no wind speed, which is the case for pure reactive power production when only the converter is operating.

Figure 4:
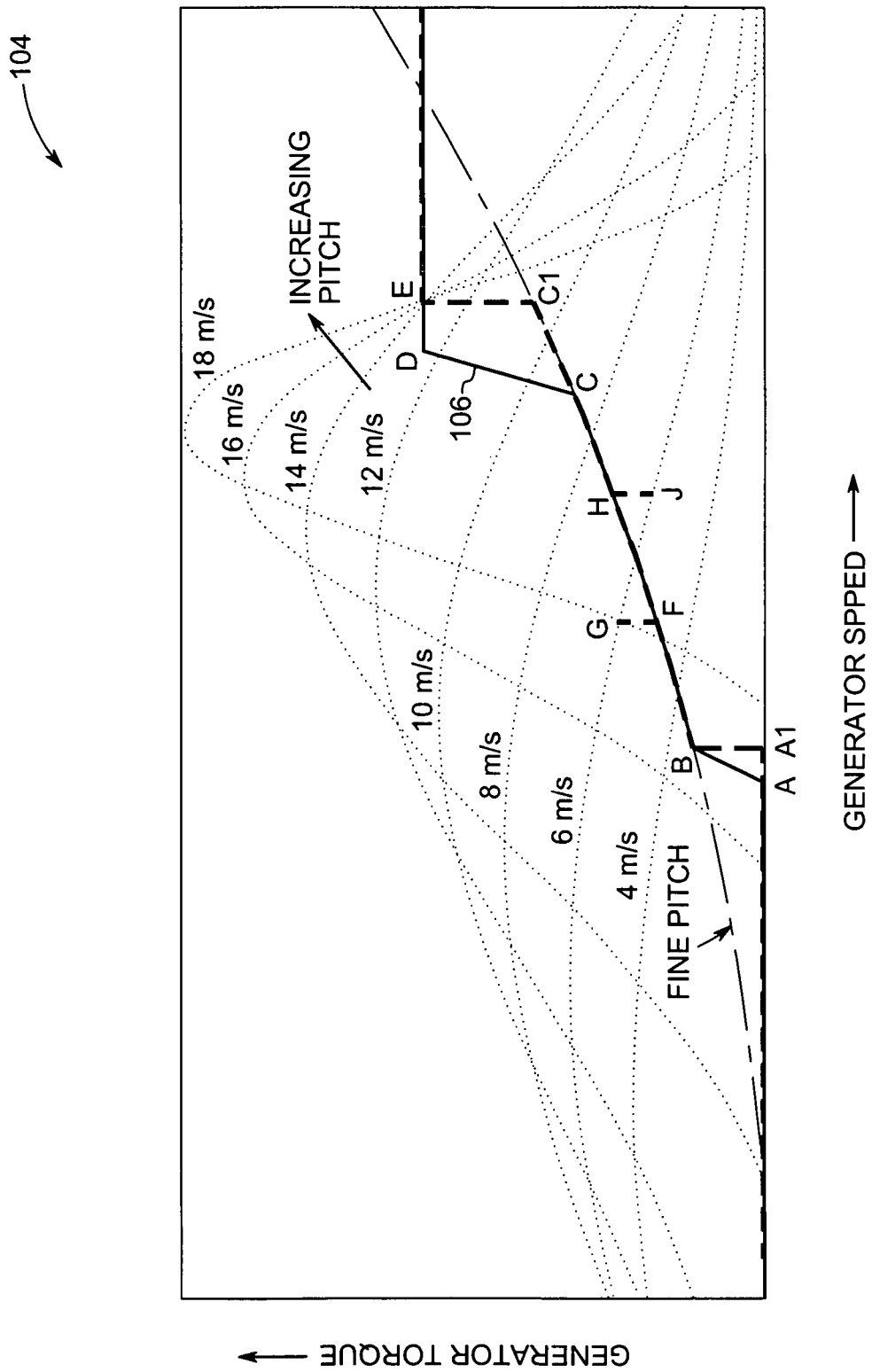
FIG. 4 is a graphical representation of a torque-speed chart for a wind turbine generator at different wind speeds.

Similarly, as will be appreciated by one skilled in the art, materials when subjected to cyclic stress, fail at much lower load than their ultimate strength. Thus, for a high velocity low turbulence wind (high wind mean speed and low wind variance) turbine accumulates fatigue at a lower rate, as it is wind variance and not the mean wind speed that chiefly contributes to fatigue, and hence a decision may be made to up rate the turbine to increase the power capture without sacrificing the baseline life. The increase of the rated power output of the wind turbine generator during high wind speed conditions is explained in greater detail with the help of a torque-speed chart 104 for a wind turbine generator as shown in FIG. 4.

As illustrated, the solid line 106 shows the various states, which a turbine goes through as the wind speed increases from cut-in wind speed (~4 m/s) to very high wind speeds (18 m/s). At point A, when wind is at cut-in speed, turbine starts. As wind speed increases, turbine is poised to capture maximum power from incoming wind, hence the pitch is fixed at fine pitch (almost facing wind direction). Given a fine pitch, and a wind speed of say 6 m/s, turbine states that can be achieved by varying torque, lie on the dotted line labeled 6 m/s. On this line, the generator is operated at a point where power (i.e., the product of torque and speed) is maximal. Operating states of all such points at various wind speeds is the solid line A-F-H-C. This regime may be termed a "Below Rated Operation" regime. As the wind speed rises further, there is a potential of turbine crossing its ultimate/fatigue limit. Hence power capture is limited by pitching the blades. Point E is called the rated power set point, and torque and speed at this point are called rated torque ($T_E$, typically around 10090 Nm in a current design) and rated generator speed ($N_E$, typically around 1440 rpm in the current design) respectively. If wind speed exceeds rated speed (14 m/s in the above diagram for the exemplary system), pitch is varied so that the turbine operating state (dotted lines 16 m/s, 18 m/s) passes through point E. This may be referred to as an "Above Rated Operation" regime. In short, in the Below Rated Operation regime, pitch is kept constant (fine pitch) and torque is varied, and in the Above Rated Operation regime, torque is kept constant, pitch is varied and the turbine stays at point E on the torque-speed chart.

Generally, the rated power set point E is a hard coded value that limits the maximum power captured by the wind turbine generator during high wind conditions. However, as described above, in the present technique, the rated power set point E is dynamically changed or up rated on the torque-speed chart depending upon the mean wind speed (V) and wind variance (S) for short durations. The position of rated power set point E depends on the ultimate and fatigue load considerations. For example, due to purely mechanical considerations (centrifugal loads) the generator speed may be maintained within a maximum speed limit (generally around 1600 rpm for an exemplary current design) and due to electrical limits of generator, the generator may be maintained within a maximum torque limit (generally around 11030 Nm for the same current design). Thus, if the rated torque and rated generator speed are below the maximum speed and the maximum torque limits, the wind turbine generator may be up rated within a small window (1440-1600 rpm and 10090-11030 Nm) without crossing the ultimate loads.

It should be noted that, fatigue loads accumulate over time. Potential for ultimate maintenance problems and even failure increases as the systems exceed their design fatigue limits. The fatigue may be estimated in real time based on wind history using signal processing based on generated transfer functions of power and damage rates. Because the baseline life of a turbine is calculated assuming a worst-case turbulence, there is an opportunity of up rating turbine, whenever wind variance is lesser than the assumed worst-case turbulence, while keeping life greater than that predicted.

As will be appreciated by one skilled in the art, the particular operating conditions and the decision of whether or not to up rate the wind turbine generator based upon the assessment of the particular operating conditions, may be stored in the memory for future reference. An optimal torque-speed schedule for rated power set point may therefore be derived based upon the past operating conditions history and the decisions stored in the memory. Alternatively, the optimal torque-speed schedule may be derived during the design phase of the wind turbine generators through any wind turbine simulation software that optimizes output power of the wind turbine generator under constraint on life by varying rated power set point as a function of operating parameters (typically, input wind characteristics such as mean wind speed and wind variance). A wind turbine generator may then be up rated for the current operating conditions by dynamically changing rated power set point based upon the derived optimal torque-speed schedule.

Figure 5:
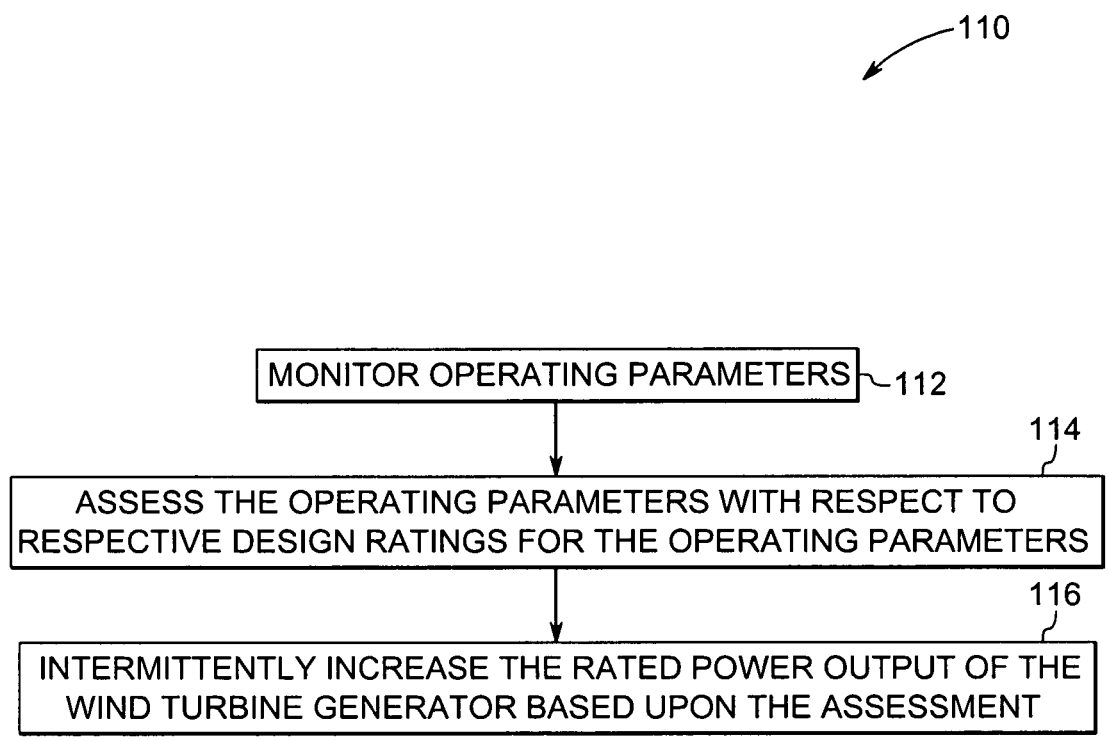
FIG. 5 is a flow chart illustrating an exemplary method of operating a wind farm according to aspects of the present technique.

Exemplary control logic for regulating power rating of a wind turbine generator based on the operating conditions of the wind turbine generator is depicted in FIG. 5. As illustrated, in the exemplary logic, designated generally by the reference numeral 110, a plurality of operating parameters of the wind turbine generator may be acquired and monitored via one or more sensors at step 112. The plurality of operating parameters are then assessed with respect to respective design ratings for the operating parameters at step 114 via a controller. It should be noted that the assessment may be carried out via a local controller or via a wind farm control system. The rated power output of the wind turbine generator may then be intermittently increased during high wind speed conditions based upon the assessment at step 116.

The techniques for intermittently increasing the rated power of the wind turbine generator as described in various embodiments discussed above provide increased power output using the existing wind turbine generator without reducing its baseline life. Alternatively, a wind turbine generator of lower rating than that currently used may be employed to provide the same level of output power. Real time knowledge of the mechanical, thermal and/or electrical operating conditions allow the assessment of unused capacity within the design and may therefore permit the extraction of additional wind energy without exceeding the critical mechanical, electrical and/or thermal stress limits. The flexible, condition-based, real-time rating assessment allows this additional energy to be captured with no incremental cost. It should be noted that, since turbine is subjected to minimum wind variance, in certain embodiments, the rated power output as well as the life of the wind turbine generator may increase than the current power output and the baseline life.

As will be appreciated by one skilled in the art, the present technique allows the maximum output of a wind turbine to be increased without entailing any change of hardware and may therefore be retro-fitted as a control system upgrade to the existing wind turbine generators. In short, the present techniques leads to higher annual energy capture, lower cost of energy and enhanced efficiency of the existing plant and equipment with minimum hardware modifications.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for regulating power rating of a wind turbine generator of a wind turbine, the method comprising:
   calculating a baseline predicted life of the wind turbine based on an estimated wind turbulence;
   sensing a plurality of operating parameters of the wind turbine generator;
   assessing the plurality of operating parameters with respect to respective design ratings for the operating parameters by estimating fatigue in real time based on wind history using signal processing via generated transfer functions of power and damage rates;
   uprating a power set point of the wind turbine when the assessment indicates that a sensed wind turbulence is lower than the estimated wind turbulence; and
   adjusting at least one boundary of at least one command signal to modify torque, speed, blade pitch, current, reactive power, or combinations thereof for dynamically modifying a rated power output of the wind turbine generator based at least in part upon the power set point.

2. The method of claim 1, wherein the plurality of operating parameters comprise electrical operating parameters, or mechanical operating parameters, or thermal operating parameters, or meteorological operating parameters, or any combination thereof.

3. The method of claim 1, wherein the plurality of operating parameters comprise mechanical loads, or wind speed, or mean wind speed, or wind speed variance, or wind turbulence intensity, or projected wind speed, or temperature loads, or atmospheric temperature, or atmospheric pressure, or air density, or output power of wind turbine generator, or torque or speed of generator or rotor, or blade pitch angle, or any combination thereof.

4. The method of claim 3, wherein the wind speed variance is computed based on the wind speed and the rotor speed.

5. The method of claim 1, wherein dynamically modifying the rated power output comprises intermittently operating the wind turbine generator at a higher torque or speed than a design rated torque or speed.

6. The method of claim 1, wherein dynamically modifying the rated power output comprises intermittently operating the wind turbine generator at higher output currents than a design rated current.

7. The method of claim 1, wherein dynamically modifying the rated power output comprises increasing the rated power output for a predetermined period of time, wherein the predetermined period of time is computed based upon the assessment of the plurality of operating parameters.

8. The method of claim 1, wherein dynamically modifying the rated power output comprises dynamically changing a rated power set point, wherein the rated power set point comprises rated torque or speed of a generator, or both.

9. The method of claim 8, wherein dynamically changing the rated power set point comprises dynamically changing the rated power set point based on operating or ambient conditions, or real time rating assessment, or an operational history, or any combination thereof.

10. The method of claim 1, wherein dynamically modifying the rated power output comprises intermittently increasing the rated power output for high speed and low turbulence wind.

11. The method of claim 1, wherein dynamically modifying the rated power output comprises intermittently increasing the rated power output for operating temperature less than a specified temperature of electrical or mechanical components of the wind turbine generator.

12. The method of claim 1, further comprising deriving an optimal torque speed schedule for rated power set point based upon the assessment.

13. The method of claim 12, wherein dynamically modifying the rated power output comprises dynamically changing rated power set point based on the optimal torque-speed schedule.

14. The method of claim 1, further comprising determining a real time available power rating based upon thermal information available from continuous temperature monitoring.

15. The method of claim 14, wherein dynamically modifying the rated power output comprises intermittently increasing the rated power output based upon the real time available power rating.

16. A control system for regulating power rating of a wind turbine generator of a wind turbine, the control system comprising:
   a plurality of sensors for sensing a plurality of operating parameters of the wind turbine generator;
   a processor for calculating a baseline predicted life of the wind turbine based on an estimated wind turbulence, assessing the plurality of operating parameters with respect to respective design ratings for the operating parameters by estimating fatigue in real time based on wind history using signal processing via generated transfer functions of power and damage rates, uprating a power set point of the wind turbine when the assessment indicates that a sensed wind turbulence is lower than the estimated wind turbulence; and
   a controller for adjusting at least one boundary of at least one command signal to modify torque, speed, blade pitch, current, reactive power, or combinations thereof for dynamically modifying a rated power output of the wind turbine generator based at least in part upon the assessment power set point.

17. The control system of claim 16, wherein the plurality of operating parameters comprise electrical operating parameters, or mechanical operating parameters, or thermal operating parameters, or meteorological operating parameters, or any combination thereof.

18. The control system of claim 16, wherein the plurality of operating parameters comprise mechanical loads, or wind speed, or mean wind speed, or wind speed variance, or wind turbulence intensity, or projected wind speed, or temperature loads, or atmospheric temperature, or atmospheric pressure, or air density, or output power of wind turbine generator, or torque or speed of generator or rotor, or blade pitch angle, or any combination thereof.

19. The control system of claim 16, wherein the controller dynamically modifies the rated power output by intermittently operating the wind turbine generator at a higher torque or speed than a design rated torque or speed.

20. The control system of claim 16, wherein the controller dynamically modifies the rated power output by intermittently operating the wind turbine generator at higher output currents than a design rated current.

21. The control system of claim 16, wherein the controller dynamically modifies the rated power output by dynamically changing a rated power set point, wherein the rated power set point comprises rated torque or speed of a generator, or both.

22. The control system of claim 21, wherein dynamically changing the rated power set point comprises dynamically changing the rated power set point based on operating or ambient conditions, or a real time rating assessment, or an operational history or any combination thereof.

23. The control system of claim 16, wherein the processor further derives an optimal torque-speed schedule for a rated power set point based upon the assessment.

24. The control system of claim 23, wherein the controller dynamically modifies the rated power output by dynamically changing the rated power set point based on the optimal torque-speed schedule.

25. The control system of claim 16, wherein the processor further determines a real time available power rating based upon thermal information available from continuous temperature monitoring.

26. The control system of claim 25, wherein the controller dynamically modifies the rated power output based upon the real time available power rating.

27. A wind turbine generator of a wind turbine, comprising:
a control system configured to dynamically modify a rated power output of the wind turbine generator, the control system comprising
a processor for calculating a baseline predicted life of the wind turbine based on an estimated wind turbulence, assessing a plurality of operating parameters with respect to respective design ratings for operating conditions of the wind turbine generator by estimating fatigue in real time based on wind history using signal processing via generated transfer functions of power and damage rates, uprating a power set point of the wind turbine when the assessment indicates that a sensed wind turbulence is lower than the estimated wind turbulence, where the estimating fatigue in real time includes measuring in real time wind variance from the estimated worst case wind turbulence; and
a controller for adjusting at least one boundary of at least one command signal to modify torque, speed, blade pitch, current, reactive power, or combinations thereof for dynamically modifying a rated power output of the wind turbine generator based at least in part upon the power set point.

28. The wind turbine generator of claim 27, wherein the operating conditions of the wind turbine generator comprise electrical operating conditions, or mechanical operating conditions, or thermal operating conditions, or meteorological operating conditions, or any combination thereof.

29. The method of claim 1, comprising maintaining turbine blade pitch constant and varying wind turbine generator torque during a below rated operating regime.

30. The method of claim 1, comprising varying turbine blade pitch and maintaining wind turbine generator torque constant during an above rated operating regime.

31. The method of claim 1, wherein the operating parameters comprises blade pitch angle, mechanical stress, speed, thermal stress, and electrical stress of the wind turbine generator, or combinations thereof.

32. The method of claim 1, wherein the operating parameters comprises gearbox oil temperature, and operating temperature of a power converter, station transformer, or combinations thereof.

33. The control system of claim 16, wherein the controller is configured to maintain turbine blade pitch constant and vary wind turbine generator torque during a below rated operating regime.

34. The control system of claim 16, wherein the controller is configured to vary turbine blade pitch and maintain wind turbine generator torque constant during an above rated operating regime.

35. The wind turbine generator of claim 27, wherein the control system is configured to maintain turbine blade pitch constant and vary wind turbine generator torque during a below rated operating regime.

36. The wind turbine generator of claim 27, wherein the control system is configured to vary turbine blade pitch and maintain wind turbine generator torque constant during an above rated operating regime.

* * * * *